United States Patent
Brockway

(10) Patent No.: US 6,913,289 B2
(45) Date of Patent: Jul. 5, 2005

(54) FRONT FRAME UPPER-WHEEL WINGS AND REAR CATWALK, FAN AND ENGINE GUARD FOR TRASH COMPACTOR MACHINES

(76) Inventor: Robert John Brockway, W5933 Sartori La., Plymouth, WI (US) 53073

( * ) Notice: Subject to any disclaimer, the term of this patent is extended or adjusted under 35 U.S.C. 154(b) by 0 days.

(21) Appl. No.: 10/455,831

(22) Filed: Jun. 6, 2003

(65) Prior Publication Data

US 2003/0230904 A1 Dec. 18, 2003

Related U.S. Application Data

(60) Provisional application No. 60/388,232, filed on Jun. 13, 2002.

(51) Int. Cl.$^7$ .............................................. B62D 25/16
(52) U.S. Cl. .................. 280/848; 280/154; 296/190.03; 172/509
(58) Field of Search ...................... 296/190.03; 280/847, 280/848, 153.5, 154, 849, 850; 172/508, 509, 510

(56) References Cited

U.S. PATENT DOCUMENTS

| | | | |
|---|---|---|---|
| 3,879,059 A | * | 4/1975 | Gibes ......................... 280/848 |
| 3,997,183 A | | 12/1976 | Russey |
| 4,294,465 A | * | 10/1981 | Simmons ..................... 280/756 |
| 4,339,016 A | | 7/1982 | Gerresheim |
| 4,379,565 A | * | 4/1983 | Riddle ......................... 280/160 |
| 5,358,355 A | | 10/1994 | Brockway |
| 5,553,932 A | * | 9/1996 | Freeman ..................... 305/107 |
| D379,630 S | | 6/1997 | Brockway |
| 5,676,493 A | | 10/1997 | Brockway |
| 5,769,507 A | | 6/1998 | Brockway |
| 5,839,743 A | * | 11/1998 | Weinkauf ..................... 280/154 |
| 5,984,037 A | | 11/1999 | Duhem |
| 6,042,192 A | | 3/2000 | Brockway |
| 6,273,516 B1 | | 8/2001 | Brockway |

OTHER PUBLICATIONS

U.S. Appl. No. 10/455,828, filed Jun. 6, 2003, Brockway.

* cited by examiner

Primary Examiner—Joseph D. Pape
(74) Attorney, Agent, or Firm—Stevens & Showalter LLP

(57) ABSTRACT

Structure for protecting landfill compactor machines against damage during operation is provided. In one aspect, deflector structure is provided for deflecting debris away from the cab of the machine. In another aspect, a rear bumper is provided for protecting the radiator and engine of the machine and for providing a catwalk for a worker to walk across the rear of the machine.

14 Claims, 5 Drawing Sheets

FRONT FRAME UPPER-WHEEL WINGS AND REAR CATWALK, FAN AND ENGINE GUARD FOR TRASH COMPACTOR MACHINES

CROSS-REFERENCE TO RELATED APPLICATION

This application claims priority to Provisional Application U.S. Ser. No. 60/388,232, filed Jun. 13, 2002, and entitled FRONT FRAME UPPER-WHEEL WINGS AND REAR CATWALK, FAN AND ENGINE GUARD FOR TRASH COMPACTOR MACHINES, the disclosure of which is incorporated herein by reference.

BACKGROUND OF THE INVENTION

Existing landfill compactors may be operated so that as the compactor moves rearwardly, debris is thrown by the front wheels toward the operator and the cab of the machine. Additionally during rearward movement of the machine, the engine/radiator area of the machine may be damaged.

There is a need for structure which deflects at least a portion of debris which is commonly thrown by the front wheels towards the operator cab during rearward movement of the machine and, further, structure which provides some degree of protection for the rear portion of the compactor during operation.

SUMMARY OF THE INVENTION

In one aspect of the invention, deflector structure is provided for deflecting debris away from the operator and away from the cab of the machine.

In another aspect of the invention, a bumper for attachment to the rear of a landfill compactor machine is provided for protecting the radiator and engine of the machine and for providing a catwalk for a worker to walk across the rear of the machine.

DESCRIPTION OF THE INVENTION

The invention comprises elements for attachment to existing landfill compactors, such as a Caterpillar Model 836 trash compactor, and, in particular, the invention provides protection to operators of landfill compactor machines, and further protects the compactor against damage during operation.

In one aspect of the invention, deflector structure is provided for deflecting debris away from the operator and away from the cab of the machine.

Figure 1:
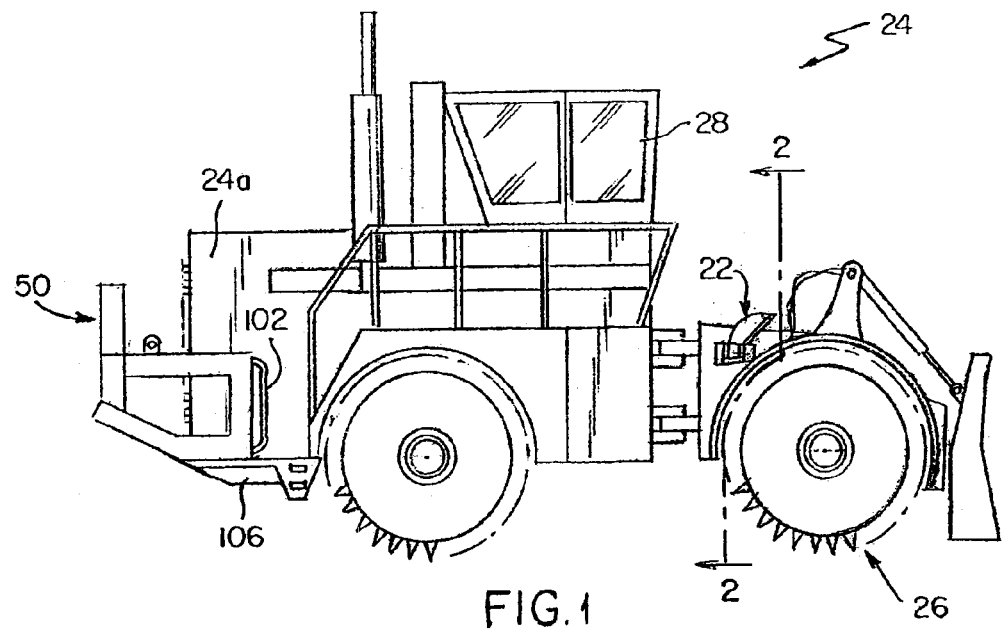
FIG. 1 is a side view of a landfill compactor machine having deflectors according to an embodiment of the present invention.
Figure 2:
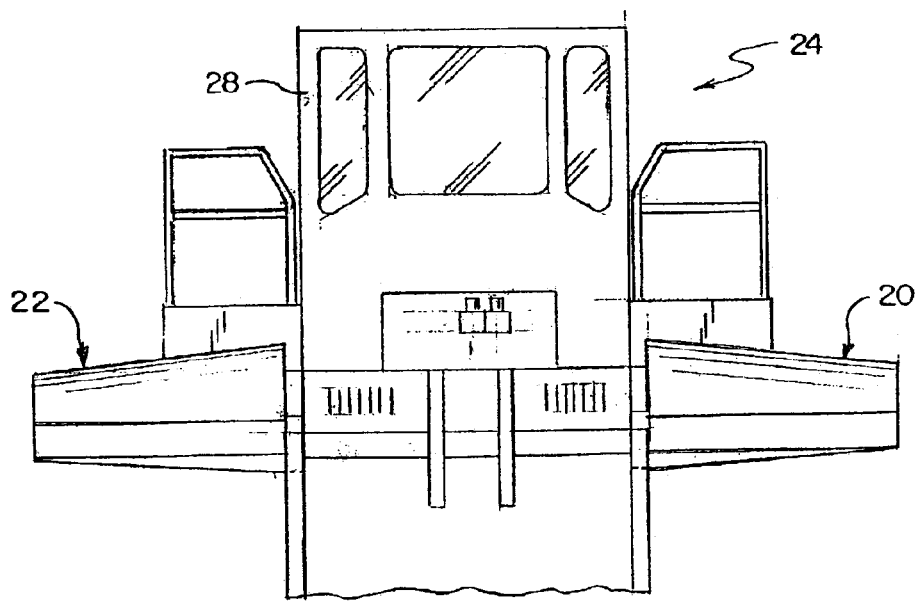
FIG. 2 is a sectional view, taken along lines 2—2 of FIG. 1, so as to illustrate the wings of FIG. 1.
Figure 3:
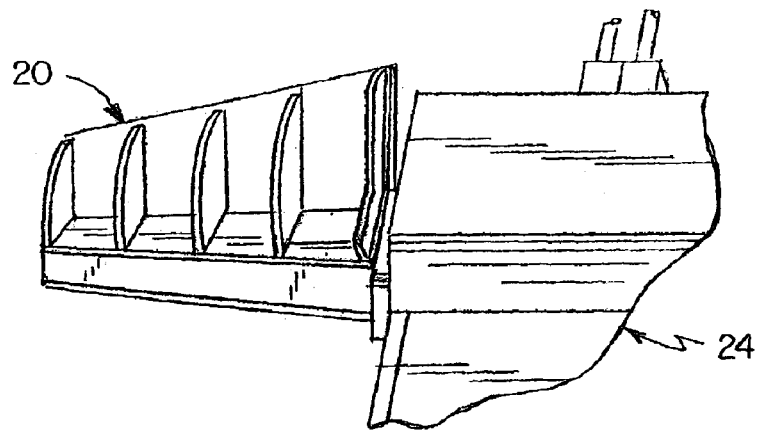
FIG. 3 is a back view of the left side wing as seen from the cab of the machine of FIG. 1.
Figure 4:
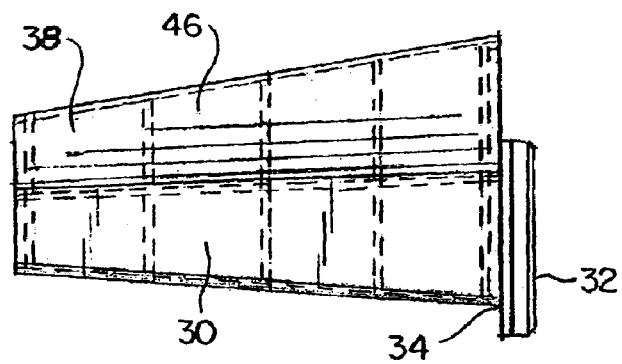
FIG. 4 is a bottom view of a wing of FIG. 2.
Figure 5:
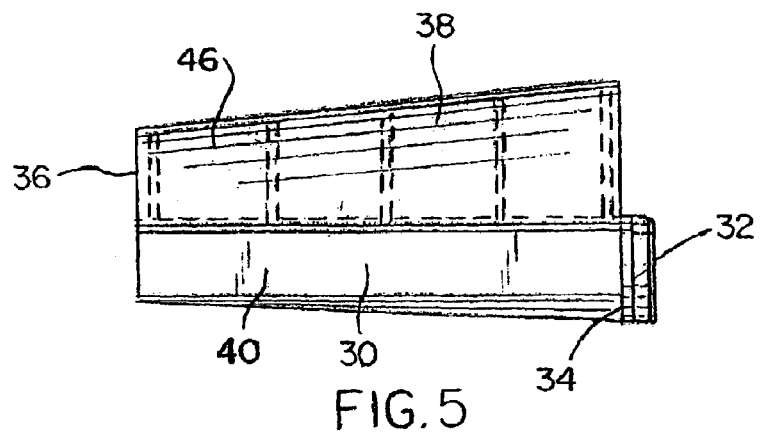
FIG. 5 is a front view of a wing of FIG. 2.
Figure 6:
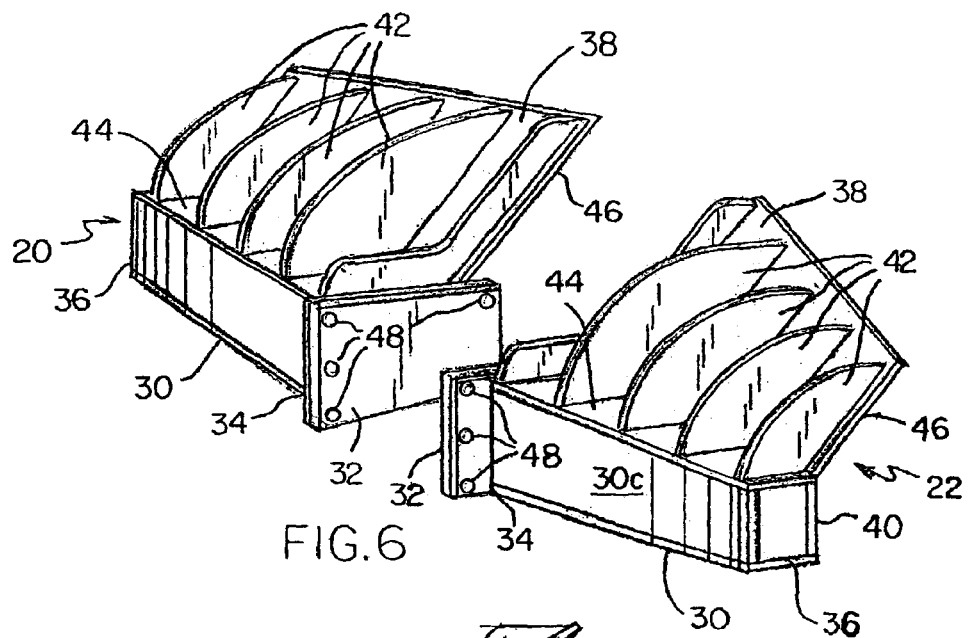
FIG. 6 shows back angled views of the wings of FIG. 2.
Figure 6A:
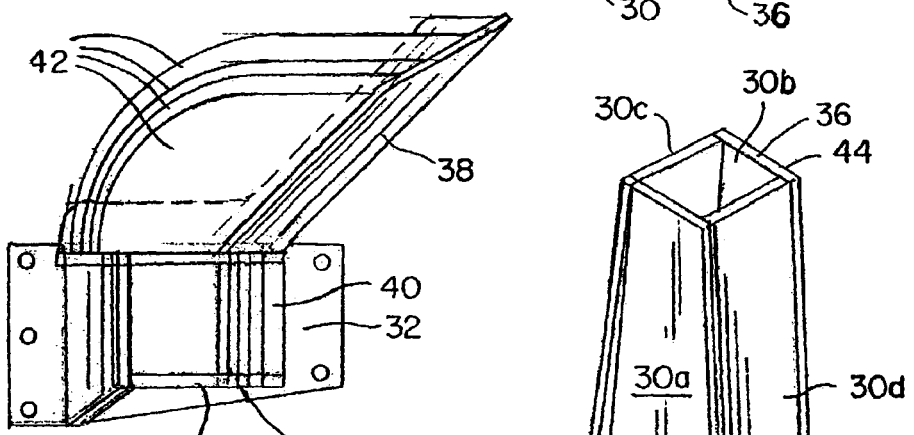
FIG. 6A is an end view of a wing with the distal end of the base structure rather than the mounting plate positioned closest to the viewer.
Figure 7:
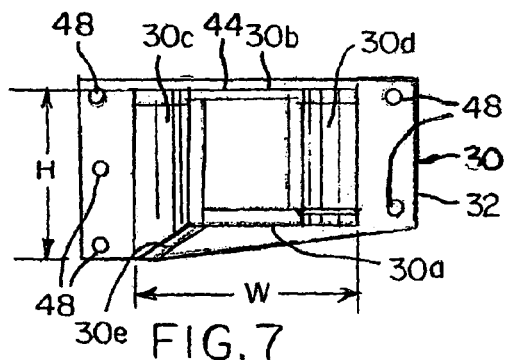
FIG. 7 is an end view of the base structure.
Figure 7A:
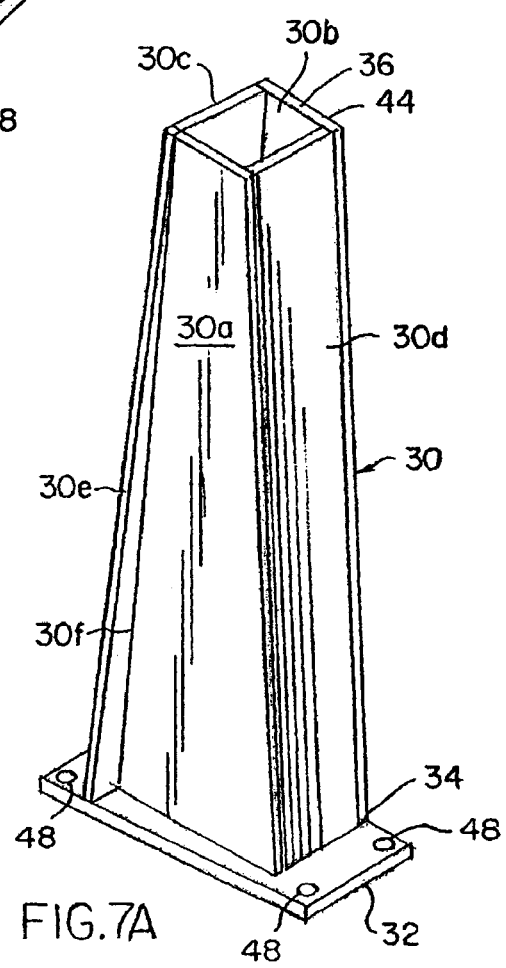
FIG. 7A is a perspective view of the base structure.

Referring to FIGS. 1–7A, the invention comprises a pair of upper wings 20, 22 which are attached above the front wheels 26 on either side of the front frame of the machine 24. The wings 20, 22 are preferably mounted to the left and right sides at 1 o'clock and 11 o'clock positions, respectively, relative to the rotational axis of the wheels 26, whereby the wings 20, 22 are positioned between the front wheels 26 and the windows of the cab 28. It is also contemplated that the wing 20 may be mounted to the front frame of the machine 24 at a position falling within the range of 12 o'clock and 3 o'clock and the wing 22 may be mounted to the front frame of the machine 24 at a position falling within the range of 9 o'clock and 12 o'clock.

Referring in particular to FIGS. 4–7A, each wing 20, 22 comprises an elongated base structure 30 including a mounting plate 32 at a proximal end 34 thereof. The base structure 30 defines a hollow quadrilateral structure having a height dimension H, see FIG. 7, of approximately 9.25 inches and a front to rear width dimension W, see FIG. 7, which linearly decreases from approximately 12 inches at the proximal end 34 to 6 inches at the distal end 36 of the base structure 30. As is apparent from FIGS. 7 and 7A, the base structure 30 comprises first and second plates 30a and 30b, each of which has a quadrilateral shape and extends at an angle of about 90 degrees to the mounting plate 32. The base structure 30 further includes third and fourth plates 30c and 30d which are angled towards one another such that they extend at an angle less than 90 degrees relative to the base structure 30. The third plate 30c also has an edge 30e which extends outwardly beyond a corresponding edge 30f of the first plate 30a.

A deflector plate 38 extends upwardly and forwardly from a front side 40 of the base structure, at an angle of approximately 45° relative to the front side 40. A plurality of spaced support ribs 42 are mounted to a top side 44 of the base structure 30 and are attached to a back side of the deflector plate 38 to support the deflector plate 38 and counteract forces from debris flying off the wheels 26 and impacting a front face 46 of the deflector plate 38. The deflector plate 38 extends from the base structure 30 near the mounting plate 32 approximately 18 inches and extends along the entire length of the base structure 30 from the mounting plate 32 to the distal end 36 of the base structure 30.

The wings 20, 22 are mounted to the machine 24 by a plurality of fasteners extending through holes 48 in the mounting plates 32. Further, the location of the wings 20, 22, as described above, is such that debris thrown up by the wheels 26 of the compactor machine 24, as the machine 24 moves rearwardly, will be engaged and deflected by the wings 20, 22, rather than being thrown up to the cab 28 of the machine 24. It should be noted that the extension of the wings 20, 22 outwardly from the respective mounting points on the machine 24 is preferably selected with reference to the width of the front wheels 26 to ensure that the wings 20, 22 intercept any debris thrown toward the cab 28 by the front wheels 26.

Figure 8:
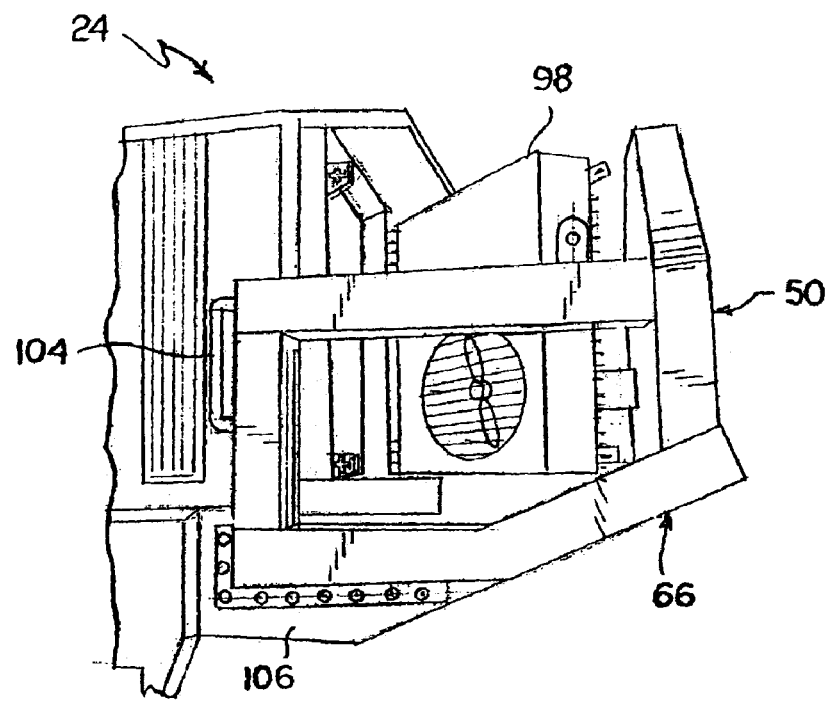
FIGS. 8 and 9 are side views of the bumper of the present invention attached to a compactor machine.
Figure 9:
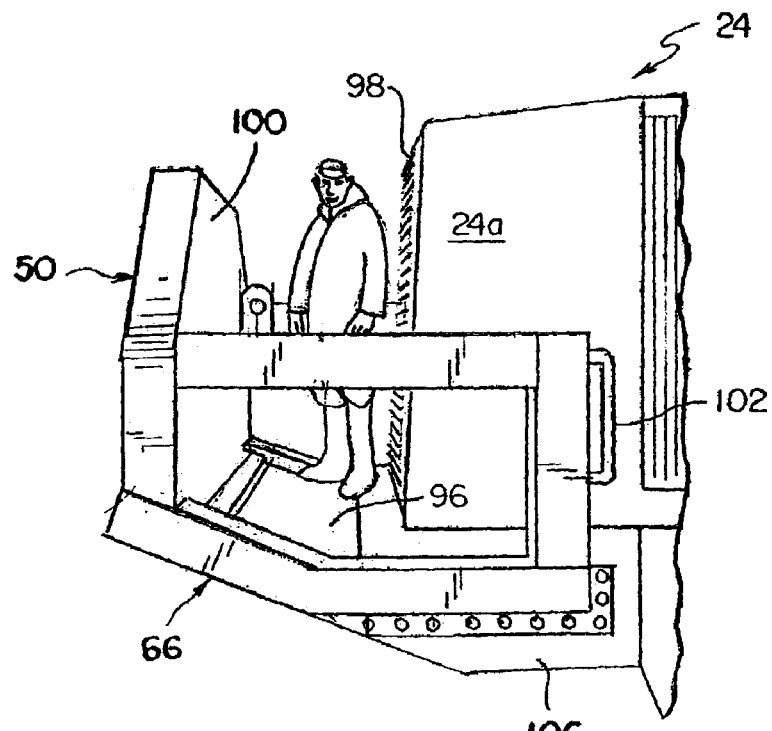
Figure 10:
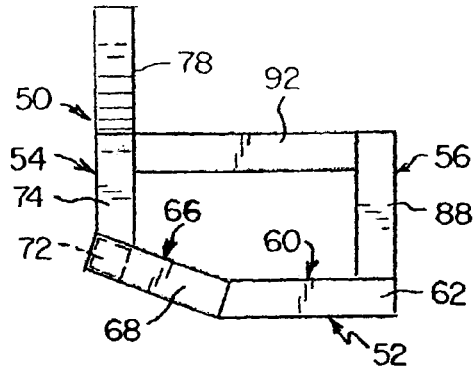
FIG. 10 is a side view of the bumper of the present invention.
Figure 12:
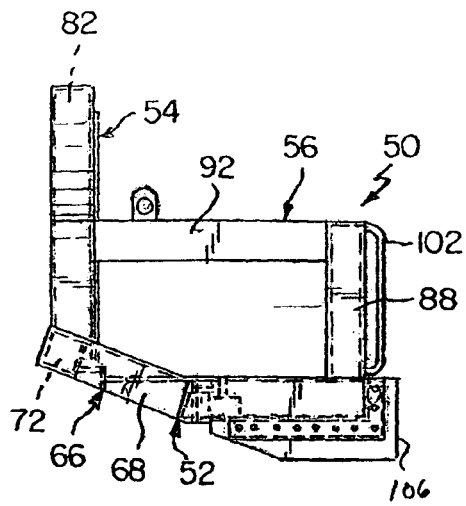
FIG. 12 is a side view of the bumper of the present invention.
Figure 11:
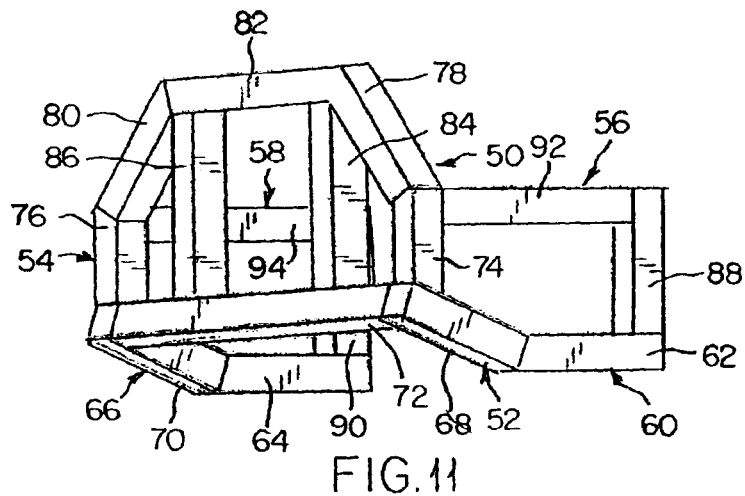
FIG. 11 is an angled view of the bumper of the present invention.
Figure 13:
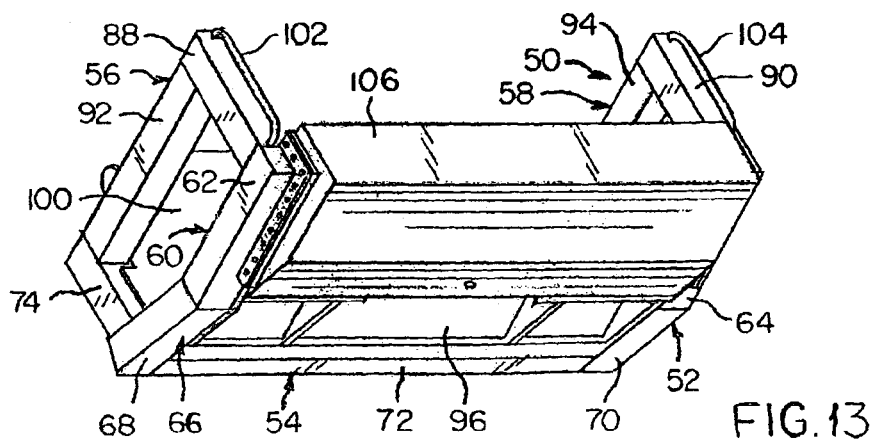
FIG. 13 is an angled view of the bumper of the present invention.

In another aspect of the invention, as illustrated in FIGS. 1 and 8–13, a bumper 50 for attachment to the rear of a landfill compactor machine 24 is provided for protecting the radiator 98 and engine of the machine 24, and for providing a catwalk 96 for a worker to walk across the rear of the machine.

The attachment comprises a frame formed of heavy square tubing. As best seen in FIGS. 10–13, the frame comprises a bottom frame portion 52, a rear frame portion 54 and side frame portions 56, 58. The bottom frame portion 52 includes a front portion 60 formed by two tubes 62, 64 extending parallel to each other in a generally horizontal plane, and a rear section 66 formed by a pair of tubes 68, 70 attached to the front pair of tubes 62, 64 and extending upwardly in a rearward direction at an angle of approximately 20°. The bottom frame portion 52 further includes a lower cross tube 72 extending between distal ends of the tubes 68, 70 forming the rear section 66.

The rear frame portion 54 is a generally planar vertical structure and includes a pair of outside tubes 74, 76 extending generally vertically upwardly from the distal end of the tubes 68, 70 forming the rear section 66, a pair of inwardly angled tubes 78, 80 extending upwardly from upper ends of the outside tubes 74, 76, an upper cross tube 82 extending between upper ends of the inwardly angled tubes 78, 80, and a pair of inside tubes 84, 86 spaced inwardly from the outside tubes 74, 76 and extending upwardly from the lower cross tube 72 to the upper cross tube 82.

The side frame portions 56, 58 each include a vertical tube 88, 90 extending vertically upwardly from proximal ends of the tubes 62, 64 forming the front portion 60 of the bottom frame portion 52, and horizontal tubes 92, 94 extending rearwardly from upper ends of the vertical tubes 88, 90 to respective attachment points at the upper ends of the outside tubes 74, 76 for the rear frame portion 54.

A support panel 96 (see also FIG. 9) is mounted on the frame at the rear section 66 of the bottom frame portion 52 and forms a platform for supporting a worker. The bottom frame portion 52 is dimensioned with a sufficient extension to the rear to allow the fan and radiator 98 to swing or pivot outwardly for maintenance.

A rear panel 100 (see also FIG. 9) is mounted on the rear frame 54, and the rear frame 54 provides a handrail which, in combination with the side frame portions 56, 58, provide a protective railing for preventing a worker on the platform 96 from falling.

It should be understood that when the bumper 50 is mounted to the rear of a trash compactor machine 24, there will be a gap between the side frame portions 56, 58 and the back of the machine 24, i.e., rear-side portions 24a of the machine 24, to permit a worker to access the platform 96 through an area in front of the bumper 50. Also, it should be noted that handrails 102, 104 may be provided on front surfaces of the vertical tubes 88, 90 for the side frame portions 56, 58.

The bumper 50 further provides protection against damage for the rearward structure of the trash compactor machine 24. In particular, the bumper 50 provides an impact resistant structure for protecting the engine/radiator area of the machine from being damaged, such as during rearward movement of the machine. The bumper 50 also provides a platform for allowing an operator to easily clean out a fan forming part of the radiator. The upwardly angled rear section 66 of the bumper 50 forms a continuation of the upward angle formed on the bottom of the existing rear bumper 106 (see FIGS. 8 and 13) of the machine and ensures that the bottom of the bumper 50 does not become caught on underlying trash if and when the wheels sink in.

What is claimed is:

1. A landfill compactor machine having a pair of front wheels comprising: deflector structure including a first wing mounted on a frame of the compactor machine so as to be positioned between a wheel and the cab and being capable of counteracting forces of debris flying off the wheel, wherein said wing comprises an elongated base structure, a deflector plate and support structure coupled to said elongated base structure and said deflector plate, a front face of said deflector plate extending at an angle to a plane substantially perpendicular to a side of said frame of the machine.

2. A landfill compactor machine as set forth in claim 1, wherein said first wing is mounted on a left side of the compactor machine so as to be positioned between a left front wheel and the cab and further comprising a second wing mounted on a right side of the compactor machine so as to be positioned between a right front wheel and the cab.

3. A landfill compactor machine of claim 2 wherein the position of the left side wing is within the range of 12 o'clock and 3 o'clock positions relative to the rotational axis of the front wheels and the position of the right side wing is within the range of 9 o'clock and 12 o'clock positions relative to the rotational axis of the front wheels.

4. A landfill compactor machine of claim 2 wherein the position of the left side wing is at a 1 o'clock position relative to the rotational axis of the front wheels and the position of the right side wing is at an 11 o'clock position relative to the rotational axis of the front wheels.

5. A landfill compactor machine of claim 2 wherein said second wing includes an elongated base structure and a deflector plate.

6. A landfill compactor machine of claim 5 wherein the deflector plate of each of said first and second wings extends upwardly and forwardly from a front side of the elongated base structure at an angle relative to the front side of the elongated base structure.

7. A landfill compactor machine of claim 5 wherein the elongated base structure is a hollow quadrilateral structure.

8. A landfill compactor machine of claim 2 wherein each of the wings is mounted on the compactor machine by a plurality of fasteners extending through a mounting plate having a plurality of apertures.

9. A landfill compactor machine of claim 5 wherein each of the wings has a length selected with reference to a width of the front wheel to ensure the wing intercepts any debris thrown toward the cab of the compactor machine by the front wheel.

10. A landfill compactor machine having a pair of front wheels comprising: deflector structure including a first wing mounted on a frame of the compactor machine so as to be positioned between a wheel and the cab and being capable of counteracting forces of debris flying off the wheel, said first wing being mounted on a left side of the compactor machine so as to be positioned between a left front wheel and the cab and further comprising a second wing mounted on a right side of the compactor machine so as to be positioned between a right front wheel and the cab, each of said wings including an elongated base structure and a deflector plate and further including a plurality of spaced support ribs mounted to a top side of the elongated base structure and a back side of the deflector plate.

11. A landfill compactor machine having a pair of front wheels comprising: deflector structure including a first wing mounted on a frame of the compactor machine so as to be positioned between a wheel and the cab and being capable of counteracting forces of debris flying off the wheel, said first wing being mounted on a left side of the compactor machine so as to be positioned between a left front wheel and the cab and further comprising a second wing mounted on a right side of the compactor machine so as to be positioned between a right front wheel and the cab, each of said wings including an elongated base structure and a deflector plate and the deflector plate extending from the elongated base structure up to approximately eighteen inches and extends along the entire length of the elongated base structure.

12. Deflector structure for a compactor machine having a pair of front wheels comprising: a pair of wings mounted on the compactor machine on a left side and a right side so that the left side wing is positioned between the left front wheel and the cab of the compactor machine within the range of 12 o'clock and 3 o'clock positions relative to the rotational axis of the front wheels, and so that the right side wing is positioned between the right front wheel and the cab of the compactor machine within the range of 9 o'clock and 12 o'clock positions relative to the rotational axis of the front wheels, wherein each of the wings includes an elongated base structure and a deflector plate including a plurality of spaced support ribs mounted to the top side of the elongated base structure and the back side of the deflector plate.

13. A landfill compactor machine having a pair of front wheels comprising: deflector structure including a wing mounted on a frame of the compactor machine so as to be positioned between a wheel and the cab and being capable of counteracting forces of debris flying off the wheel, wherein said wing comprises an elongated base, a deflector plate and support structure coupled to said elongated base and said deflector plate, said support structure is mounted to a side of said elongated base and a back side of said deflector plate.

14. A landfill compactor machine of claim 13, wherein said support structure comprises a plurality of spaced ribs mounted to the top side of said elongated base and the back side of said deflector plate.

* * * * *